J. N. AUGE, Jr.
COMBINATION TRUCK AND WAGON DUMP.
APPLICATION FILED MAR. 30, 1918.
1,283,031.
Patented Oct. 29, 1918.
2 SHEETS—SHEET 1.
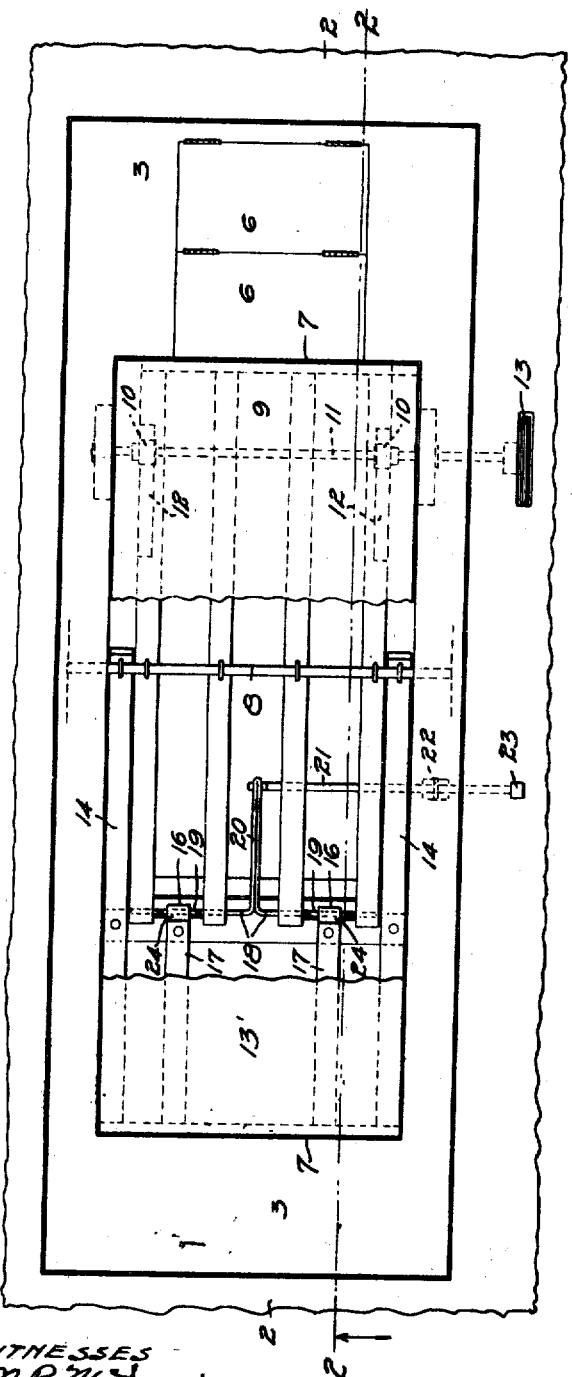
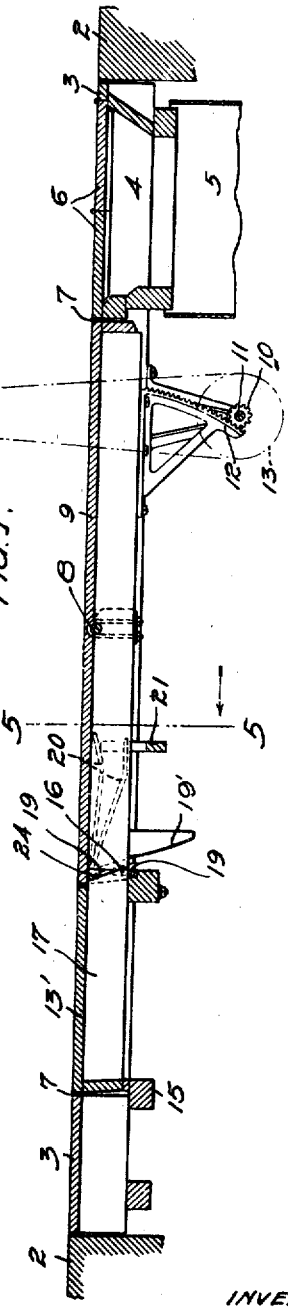
INVENTOR
JOSEPH N. AUGE JR.
ATTORNEYS J. N. AUGE, Jr.
COMBINATION TRUCK AND WAGON DUMP.
APPLICATION FILED MAR. 30, 1918.

1,283,031.

Patented Oct. 29, 1918.
2 SHEETS—SHEET 2.

WITNESSES

INVENTOR
JOSEPH N. AUGE JR.
BY
ATTORNEYS

UNITED STATES PATENT OFFICE.

JOSEPH N. AUGE, JR., OF ST. PAUL, MINNESOTA, ASSIGNOR TO FAIRBANKS, MORSE & CO., OF ST. PAUL, MINNESOTA, A CORPORATION.

COMBINATION TRUCK AND WAGON DUMP.

1,283,031.

Specification of Letters Patent.   Patented Oct. 29, 1918.

Application filed March 30, 1918.   Serial No. 225,653.

*To all whom it may concern:*

Be it known that I, JOSEPH N. AUGE, Jr., a citizen of the United States, resident of St. Paul, county of Ramsey, State of Minnesota, have invented certain new and useful Improvements in Combination Truck and Wagon Dumps, of which the following is a specification.

My invention relates to a dumping platform for grain elevators or warehouses and the object of the invention is to provide a single platform adapted for dumping either a horse drawn wagon or a motor driven truck. Before the general use of trucks, grain was hauled to the elevators or warehouses in wagons which were driven upon the dumping platform and the wagon tilted to discharge its contents into a hopper or other receptacle, the horses meanwhile standing upon a stationary portion of the platform while a tilting section thereof was operated to raise the forward end of the wagon and depress the rear end until its load was discharged. With the advent of the motor driven truck it was found that the ordinary wagon dump was too short for the wheel base of the truck and a platform of sufficient length for the truck could not be very well used for the wagon, as it would necessitate removing the team from the wagon before the platform was tilted. To provide a platform suitable for both a wagon and truck with a single tilting mechanism for both is the primary object, therefore, of my invention.

The invention consists generally in various constructions and combinations, all as hereinafter described and particularly pointed out in the claims.

In the accompanying drawings forming part of this specification,

Figure 1 is a plan view of a dumping platform embodying my invention,

Fig. 2 is a sectional view on the line 2—2 of Fig. 1,

The invention is shown, as usual in devices of this kind, in connection with a weighing scale platform and 2 represents the approaches to the platform at each end and 3 the scale platform, the scale levers under the platform being omitted, as they form no part of my present invention.

Figure 3:
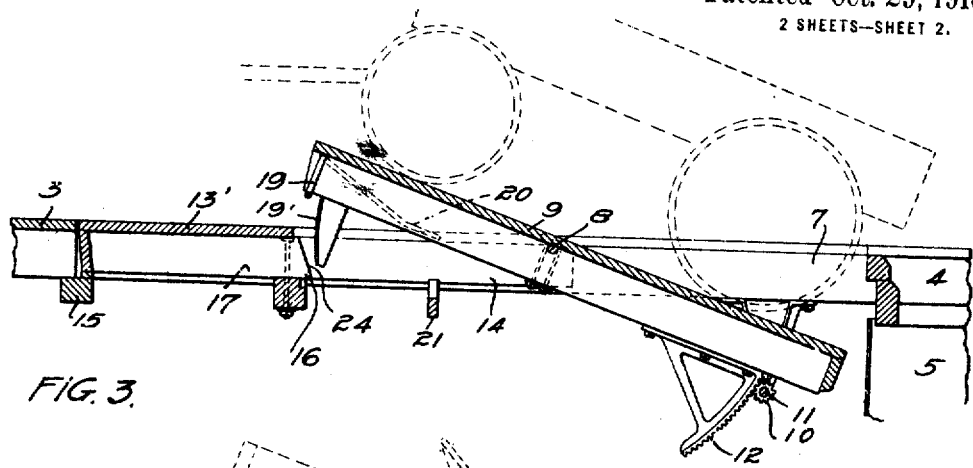
Fig. 3 is a sectional view showing the wagon dumping section of the platform in its tilted position.
Figure 4:
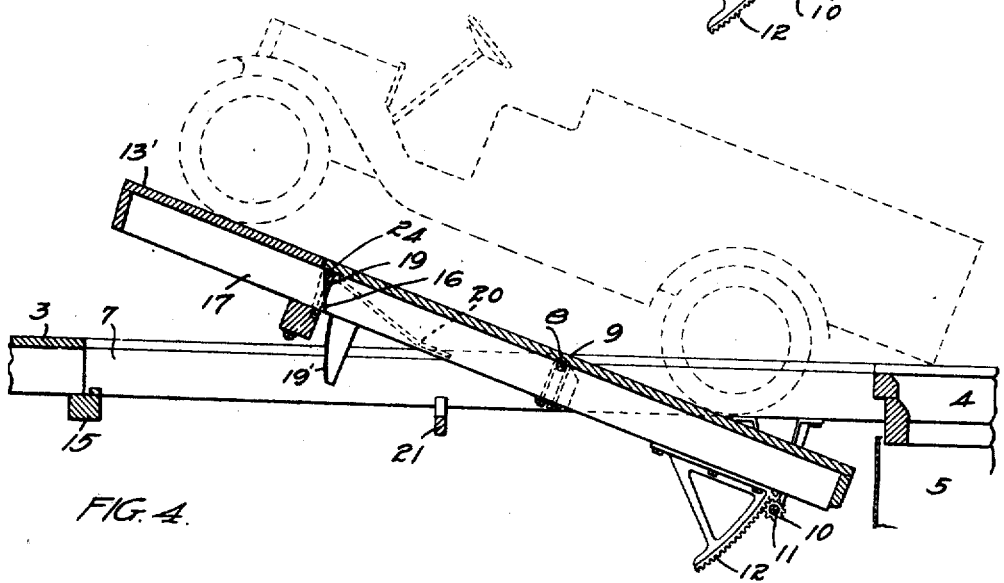
Fig. 4 is a similar view, showing the platform adapted for tilting a truck.
Figure 5:
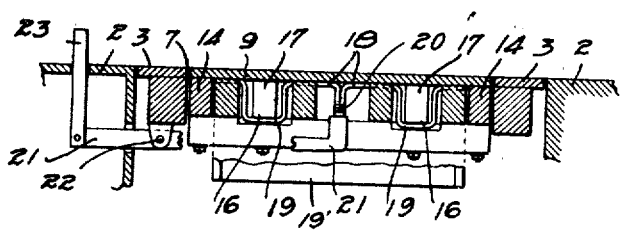
Fig. 5 is a sectional view on the line 5—5 of Fig. 2.

4 is a hopper at one end of the scale platform having its lower end vertically movable in a spout 5 through which the grain is conducted to a suitable bin, not shown. The lever is provided preferably with a sectional cover 6 by means of which the opening thereto is closed and concealed. The scale platform is provided with a rectangular opening 7. A shaft 8 is journaled in the scale platform transversely of this opening and a wagon dumping platform 9 is centrally mounted on said shaft and normally is flush with the floor of the scale platform but may be tilted in the opening 7 to discharge the wagon on the platform of its load into the hopper 4. Any suitable mechanism may be provided for tilting this wagon dumping platform, but I have shown a conventional means, consisting of pinions 10 mounted on a shaft 11 and engaging racks 12 secured to the underside of the platform. When the shaft 11 is revolved by suitable means, such as the wheel 13, the dumping platform will be tilted to discharge its load, as shown in Fig. 3, or returned to its horizontal position, as indicated in Fig. 2. At one end of the wagon dumping platform I provide an extension 13' having rails 14 mounted on the shaft 8 and normally flush with the top of the scale platform and the wagon dumping platform. The outer end of the extension 13 contacts with a suitable transverse stop 15 which projects into the opening 7 and limits downward movement of said extension. To provide for simultaneous movement of the platforms, when the device is used for dumping a truck, I provide shoulders 16 on bars 17 mounted to lap by the adjacent end of the wagon platform and a rock shaft 18 has bails 19 formed thereon for engaging the said shoulders 16 and temporarily locking the two platforms together for simultaneous movement. An operating arm 20 is formed on the shaft 18 and a lever 21 is pivoted at 22 on the scale platform and has a treadle 23 vertically movable near said platform by means of which the lever 21 may be rocked to oscillate the shaft 18 and disengage the wagon dumping platform from the truck extension and thereby allow the wagon dump to be operated independently of the truck. When the two platforms are locked together, as indicated in Fig. 2, they will be tilted simultaneously and the apparatus is then adapted for handling a loaded truck. If the next load to be dumped should be a team drawn wagon, the platform locking device will be tripped to allow the wagon dump to be operated independently.

The ends of the bars 17 are preferably beveled, as shown at 24, for contact with the bails 19 when the wagon platform is returning to its normal horizontal position, so that the two platforms will be automatically locked together when horizontal. If a truck is to be admitted first, then the locking device remains in its normal position, but if a wagon is to be dumped, the locking device is tripped and the wagon platform may then be tilted independently. A sheet metal guard 19' is preferably provided at one end of the wagon dump.

Any other suitable means may be provided for temporarily locking the two platforms together and I may modify in various ways the means for operating the two platforms.

I claim as my invention:

1. A combined truck and wagon dumping platform comprising a tilting section, a truck extension therefor, means for temporarily uniting said tilting section and said extension for simultaneous movement to dump a truck, or releasing said tilting section for independent movement to dump a wagon.

2. The combination, with a scale platform having an opening therein, of a combined truck and wagon dump mounted in said opening, means for temporarily connecting one dump to the other for simultaneous movement to unload a truck, said wagon dump when disconnected from said truck dump having an independent tilting movement to unload a wagon.

3. The combination, with a scale platform having an opening therein, of a shaft mounted transversely of said opening, a wagon dumping platform mounted on said shaft, a truck extension of said platform also mounted on said shaft and means for temporarily locking said wagon platform and said truck extension together for simultaneous movement or releasing them for independent movement of said wagon platform.

4. The combination, with a wagon dumping platform, of a truck extension therefor, said dumping platform being mounted to tilt simultaneously with said truck extension or independently thereof.

In witness whereof, I have hereunto set my hand this 18th day of March 1918.

JOSEPH N. AUGE, Jr.